United States Patent [19]

Aulich et al.

[11] 4,131,447
[45] Dec. 26, 1978

[54] CRUCIBLE FOR THE PRODUCTION OF SINGLE-MATERIAL LIGHT-GUIDING FIBERS

[75] Inventors: Hubert Aulich, Munich; Josef Grabmaier, Kempfenhausen, both of Germany

[73] Assignee: Siemens Aktiengesellschaft, Berlin & Munich, Germany

[21] Appl. No.: 761,267

[22] Filed: Jan. 21, 1977

[30] Foreign Application Priority Data

Feb. 2, 1976 [DE] Fed. Rep. of Germany ....... 2603876

[51] Int. Cl.$^2$ .......................... C03B 5/26; C03B 37/00
[52] U.S. Cl. ................................. 65/325; 65/DIG. 7; 65/2; 65/192
[58] Field of Search .................... 65/88, 191, DIG. 8, 65/DIG. 7, 121, 192, 3 A, 2, 325, 187

[56] References Cited

U.S. PATENT DOCUMENTS

| 2,002,875 | 5/1935 | Woods | 65/88 |
| 3,240,583 | 3/1966 | Holler | 65/88 |
| 3,269,821 | 8/1966 | Vatterodt | 65/191 X |
| 4,022,603 | 5/1977 | Roeder et al. | 65/121 X |

OTHER PUBLICATIONS

Bell System Technical Journal, pp. 265–269.
J. Opt. Soc. Am., pp. 1141–1148.

Primary Examiner—S. Leon Bashore
Assistant Examiner—Frank W. Miga
Attorney, Agent, or Firm—Hill, Gross, Simpson, Van Santen, Steadman, Chiara & Simpson

[57] ABSTRACT

A method for the production of single-material light-guiding fibers which have a core supported in a glass sheath in a cantilever manner by glass webs characterized by providing a crucible having an exit nozzle with an opening having a configuration of the cross section of the light-guiding fiber with a core portion connected by web portions to a surrounding annular portion, providing molten material of the light-guiding fiber in the crucible, drawing the molten material from the crucible through the exit nozzle to form a continuous integral workpiece having a core portion supported in a glass sheath in a cantilever manner by integral glass webs and continuously drawing the integral workpiece into the single-material light-guiding fiber. The crucible is formed by a pair of hollow bodies supported in an outer cylindrical member in a cantilever manner so that the cylindrical member and the pair of hollow bodies form the exit nozzle with the desired configuration.

9 Claims, 5 Drawing Figures

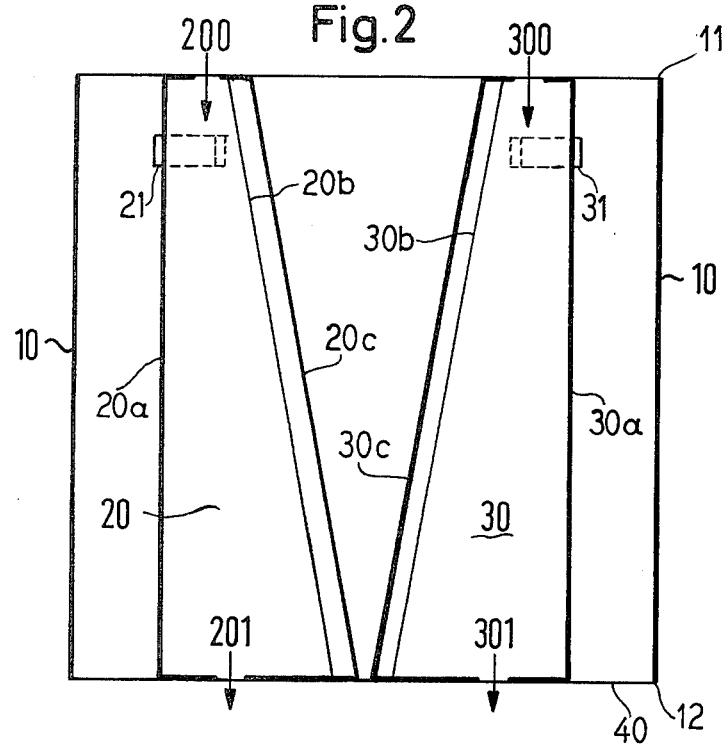
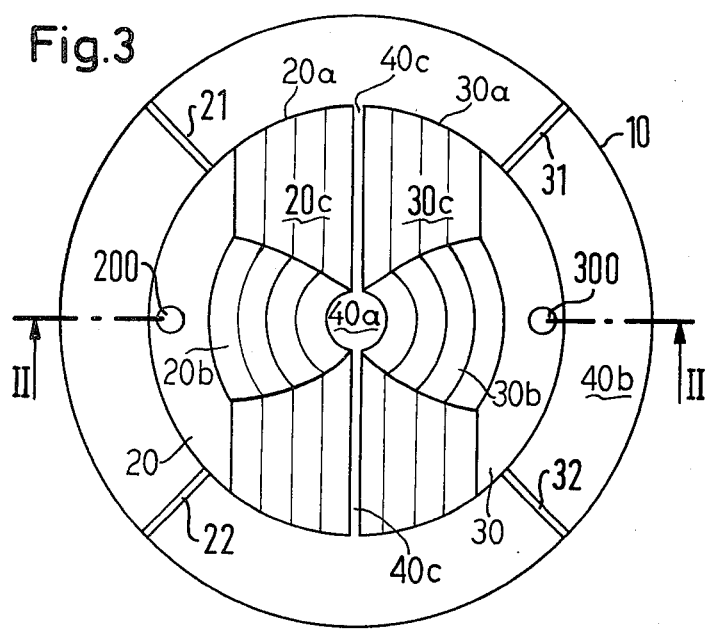

CRUCIBLE FOR THE PRODUCTION OF SINGLE-MATERIAL LIGHT-GUIDING FIBERS

BACKGROUND OF THE INVENTION

1. Field of the Invention

The present invention is directed to a process or method for the production of single-material light-guiding fibers and to a crucible used in the method.

2. Prior Art

In the production of optical light-guiding fibers, the chemical composition of the glasses which are used are often altered in order to influence the path of the index of refraction between the core and the sheathing of the light-guiding fiber. Light-guiding fibers are known in which the index of refraction increases stepwise at the junction or interface between the sheath and the core so that the core has a higher index of refraction than the sheath or fiber cladding. Light-guiding fibers are also known in which the index of refraction increases continuously when preceding from the exterior surface of the fiber toward the interior. As a result of the differing chemical compositions, it is often difficult to match or coordinate the thermal and mechanical characteristics of the materials of the fiber core to the materials of the fiber sheath or cladding. For this reason, the long-term stability and the mechanical loadability of the cables formed of such light fibers can be disadvantageously influenced.

A single-material light-guiding fiber, which is formed from a single type of glass, was suggested in an article by J. P. Kaiser, E. A. J. Marcatilli and S. E. Miller, *Bell System Technical Journal*, Vol. 52(1973), pp. 265-269. A typical cross section of such a fiber is illustrated by a fiber generally indicated at 5 in FIG. 1 of the present application. The fiber 5 consists of a glass sheath 1, which surrounds a core 2, which does not touch the sheath at any point and is connected to the sheath 1 by glass strips or webs 3 and 4 which are as thin as possible.

Since only a single kind or type of glass is used in a single-material light-guiding fiber of this type, the above mentioned problems do not occur. Additionally, because of its hollow structure, this light-guiding fiber has the advantage of being capable of being heavily mechanically loaded. In addition, because of the use of only one kind or type of glass for the entire fiber 5, special glasses can be selected which glasses distinguish themselves, for example by high mechanical, chemical and thermal stability. In this context, it should be noted that due to using the same glass for both the core and sheath, the difficulties of matching this kind or type of special glass to a second kind or type of glass does not occur.

Since total reflection will occur at the boundary surface between the core 2 of the fiber and the ambient air or, respectively, ambient gas which is entrapped between the core 2 and sheath 1, the light conveyed in the core 2 cannot laterally leave the core.

Previously, the production of a single-material light-guiding fiber was very difficult. In the previous attempts of forming the fiber, a workpiece or blank was formed by providing a quartz rod on which two thin quartz plates were attached with an 180° offset by being fused or melted on the surface of the rod. This rod was then inserted into a quartz tube and the thin quartz plates were then melted or fused to the interior surface of the quartz tube so that the quartz rod was supported in the quartz tube in a contilever manner by the quartz plates. After heating the blank to a temperature of about 1800° C. to 2000° C., the blank consisting of the quartz rod and the quartz tube can be drawn out into a fiber. With this type of production, a difficulty occurs with the securing of the thin as possible quartz plates onto the quartz rod and in addition, all parts must be thoroughly cleansed, particularly, the surfaces of the quartz rod. Contamination on the surface of the quartz rod will lead to the contamination of the subsequent core fiber and it is noted that even the tinest or smallest dust particle or the absorption of a moisture film by the quartz rod can lead to high scattering losses or absorption losses, respectively. In addition, this type of production process is not applicable for large scale or volume production.

SUMMARY OF THE INVENTION

The present invention is directed to a method for producing single-material light-guiding fibers which method is suitable for producing large quantities of the fiber.

To accomplish these goals, the method comprises providing a crucible having an exit nozzle with an opening having a configuration of a cross section of a light-guiding fiber with a core portion connected by web portions to a surrounding annular portion, providing molten material of the light-guiding fiber in the crucible, drawing the molten material from the crucible through the exit nozzle to form a continuous integral workpiece having a core portion supported in a glass sheath in a cantilever manner by glass webs and continuously drawing the integral workpiece into a single-material light-guiding fiber.

The crucible utilized in the method comprises an outer cylindrical member, a pair of hollow bodies supported in the outer cylindrical member in a cantilever manner, said outer cylindrical member and said pair of hollow bodies at one end forming an exit nozzle with an opening having a core portion connected by web portions to a surrounding annular portion, said opening having a sharp cross section of the configuration of the light-guiding fiber so that the molten material of the light-guiding fiber drawn from the exit nozzle forms an integral workpiece, which has a core portion supported in a glass sheath in a cantilever manner by web portions, for subsequent drawing into a single-material light-guiding fiber.

In order to prevent collapsing of the sheath of the workpiece onto the core, the hollow body members are provided with passages for transferring a gas so that the gas may be applied between the core portion and the glass sheath of the integral workpiece as the workpiece is drawn from the exit nozzle.

The crucible and method of the present invention enables the drawing of a single-material light-guiding fiber directly from a workpiece which is produced by the specially formed crucible.

BRIEF DESCRIPTION OF THE DRAWING

FIG. 2 is a sectional view of a crucible taken on lines II—II of FIG. 3.

FIG. 3 is a top plan view of a crucible in accordance with the present invention.

DESCRIPTION OF THE PREFERRED EMBODIMENT

Figure 1:
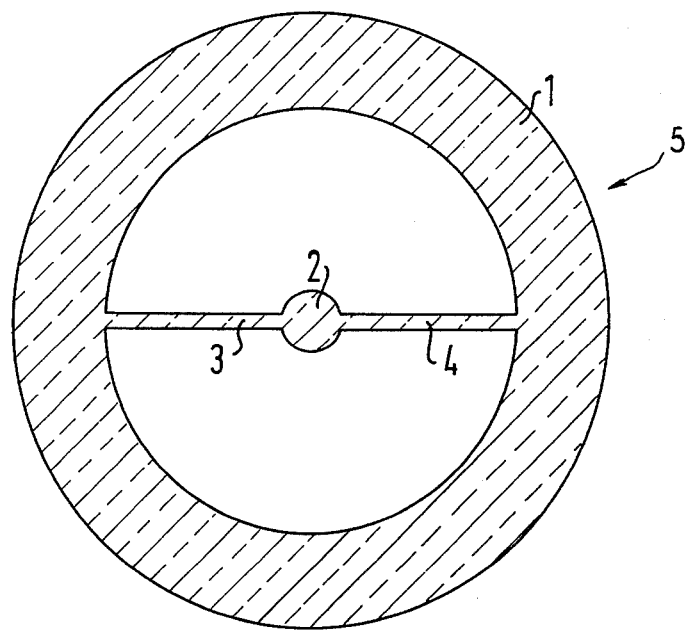
FIG. 1 is a cross-sectional view of a typical single-material light-guiding fiber.

The principles of the present invention are particularly useful in forming the single-material light-guiding fiber generally indicated at 5 in FIG. 1. The single-material light-guding fiber 5 has a sheath 1 which surrounds a core 2 which is supported within the sheath by glass strips or webs 3 and 4 which strips and webs are integral both with the core 2 and the glass sheath 1.

In order to form the fiber 5, the present invention utilizes a crucible generally indicated at 9 in FIGS. 2 and 3. The crucible 9 includes an outer cylindrical member or cylinder 10 which has a wall thickness of about 1 mm and may consist of platinum. A pair of hollow bodies 20 and 30 are disposed within the cylinder 10 and are supported in a cantilever manner therein by a plurality of cross bars 21, 22, 31 and 32 adjacent an upper end 11 of the cylinder 10. Each of the hollow bodies, which may also consist of platinum, have a surface 20a and 30a adjacent to the inner surface of the cylinder 10, these surfaces 20a and 30a as shown in FIGS. 2 and 3, may have the form of partial cylindrical surfaces so that the hollow bodies 20 and 30, when supported by the bars 21, 22, 31 and 32 without the cylinder 10, have the surfaces 20a and 30a substantially concentric with the cylinder 10. Each of the hollow bodies 20 and 30 have surfaces 20b, 30b and surfaces 20c and 30c which are inclined to the axis of the cylinder 10 as illustrated in the figures.

The hollow bodies 20 and 30 with the cylinder 10 at a lower end 12 form an exit nozzle 40 having an opening which is substantially the configuration of the cross section of a single-material light-guiding fiber such as 5. As illustrated, the opening has a core portion 40a, which corresponds to the core 2 and is surrounded by a portion 40b which corresponds to the outer sheath or casing 1 of the fiber 5. The core portion 40a is in communication with the annular portion 40b by web portions 40c. It is noted that these portions, due to the structure of thee hollow bodies 20 and 30, as well as the cylinder 10, provide sharp edges which are visible from the figures.

When using the crucible 9, the exit nozzle 40 is initially clossed off by a metal sheet which, for example, is also platinum. Glass, for example in the form of grannular material or rods, is introduced into the crucible and is melted. To accomplish the melting of the glass in the crucible 9, the crucible can, for example, have a conventional induction heating system (not illustrated). As soon as the glass has become molten and is bubble-free, the molten glass is heated to a temperature at which the viscosity of the glass melt permits a drawing of the glass fiber and which temperature for quartz glass is a temperature range of between 1800° and 2000° C. When the molten glass has reached this desired temperature, the metal sheet, which has closed the opening of the exit nozzle 40, is pulled quickly away in a downward motion and the integral workpiece exiting from the crucible through the nozzle 40 is attached to a drawing drum. With the workpiece or blank attached to a drawing drum, a single-material light-guiding fiber can be formed by drawing.

The desired fiber dimensions can be obtained or adjusted by a selection of the drawing speed. With high drawing speeds, a very fine fiber will be formed. The relationship of the cross sections of the sheath and the core of the fiber will be determined by the geometry of the exit nozzle 40 and the viscosity of the glass and will remain substantially unchanged during the drawing step.

In order to prevent a possible collapse of the workpiece or fiber shortly below the exit nozzle 40, it is advantageous to introduce an inert gas with a slight over-pressure between the core portion and the sheath portion. To accomplish this, the hollow bodies 20 and 30 are provided with openings 200, 201, 300 and 301, which form a passage for transmitting gas, such as nitrogen, through the hollow bodies 20 and 30 and into the spacing between the core portion and sheath of the workpiece as it leaves the exit nozzle 40.

If, during the drawing process, additional glass material is continuously added into the crucible 9, for example in the form of a liquid or molten glass from a supply container, a practically infinitely long light-guiding fiber can be continuously produced.

The hollow bodies 20 and 30 can also be formed differently than as illustrated in the drawings. For example, they can be replaced by plates which are arranged in the cylinder 10 to produce the same cross section at the exit nozzle 40 as the hollow bodies 20 and 30.

Figure 4:
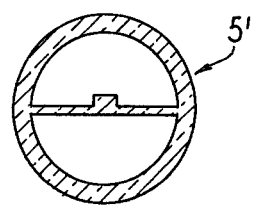
FIGS. 4 and 5 are cross-sectional views of two additional embodiments of a single-material light-guiding fiber having special cross-sectional geometry which fibers can be formed in accordance with the present invention.
Figure 5:
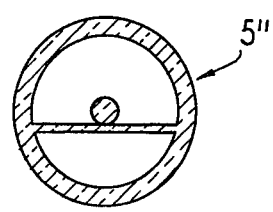

By a simple modification of the shape of the hollow bodies, it is possible to produce single-material light-guiding fibers having different cross-sectional shapes. Examples of different cross-sectional configurations are by fibers 5' of FIG. 4 and fiber 5" of FIG. 5.

The method of the present invention enables using any kind of glass whatsoever and the use of other types of materials, which have been used in the production of light-guiding fibers. For example, component glasses, which melt at low temperatures, quartz glasses or organic glasses may be used in this method.

The melting crucible can also consist of other materials than platinum. For example, the parts may be made of iridium. Because of its temperature stability, iridium is particularly suitable for the protection of the light-guiding fibers made of quartz glass. For the other types of glass materials for the fibers, the material of the crucible need only fulfill the condition of not entering into any undesirable reactions with the glass material being formed into the integral workpiece.

In the production of highly pure glasses, for example OPTIPUR starting material sold by and is a registered trademark of the Merck Company, a substantial part of the cost of the fiber production goes for the material. Therefore, the low material consumption of the inventive process has a great advantage. In comparing light-guiding fibers with a solid structure, the present fibers provide a material saving of approximately 35%.

In the sample embodiment of the light-guiding fiber 5, which was produced in accordance with the present invention, the core 2 has a diameter of 15 $\mu$m, glass sheat 1 has an outer diameter of 150 $\mu$m and an inner diameter of 100 $\mu$m, and the thickness of the glass strips or webs 3 and 4 amount to approximately 3$\mu$m.

The drawing process for drawing the fiber from the workpiece after it exits the nozzle 40 can be carried out by conventional fiber drawing process. Examples of conventionally known fiber drawing processes are described for example in an article by P. Kaiser, A. R. Tynes, H. W. Astle, A. D. Pearson, W. G. French, R. E. Jaeger and A. H. Cherin, J. Opt. Soc. Am., Vol. 63, No. 9, page 1141.

Although various minor modifications may be suggested by those versed in the art, it should be understood that we wish to employ within the scope of the patent granted hereon, all such modifications as reasonably and properly done within the scope of our contribution to the art.

We claim:

1. A crucible for the production of a light-guiding fiber having a core portion connected by web portions to a surrounding annular member, comprising:
   (a) an outer cylindrical member having an inner wall;
   (b) a pair of separate hollow bodies not connecting to one another, each hollow body having an outer wall, an inner wall, and gas flow means for gas flow through an interior of the hollow body;
   (c) support means between the inner wall of the outer cylindrical member and each hollow body for supporting the hollow bodies within the cylindrical member such that their inner walls face each other; and
   (d) an exit nozzle formed at an exit end of the crucible, said exit nozzle including: (i) a core forming means formed at lower edge portions of the facing inner walls of the hollow bodies, (ii) web forming means connecting to the core forming means and formed at exit edge portions of the inner walls, and (iii) annular member forming means connected to the web forming means and formed at the outer cylindrical member and exit edge portions of the hollow body outer walls.

2. A crucible according to claim 1, wherein the outer cylindrical member and the hollow bodies consist of platinum.

3. A crucible according to claim 1, wherein the outer cylindrical member and the hollow bodies consist of iridium.

4. A crucible according to claim 1, wherein each of the hollow bodies is substantially enclosed with upper and lower walls and said gas flow means comprises passages in the upper and lower walls for said gas flow therethrough so that the gas may be applied between the core portion and glass sheath of the integral workpiece to prevent collapsing of the sheath into the core portion.

5. A crucible according to claim 4, wherein each of the hollow bodies and the outer cylindrical member consist of platinum.

6. A crucible according to claim 4, wherein the other cylindrical member and each of the hollow bodies consist of iridium.

7. The crucible of claim 1 in which the hollow body inner walls have inclined surface portions and the outer walls are substantially vertical.

8. A crucible for the production by drawing of a light-guiding fiber having a core portion connected by web portions to a surrounding annular member, comprising:
   (a) an outer cylindrical member having an outer wall and concentric inner wall;
   (b) a pair of hollow bodies, each hollow body having a substantially vertical outer wall, an inclined inner wall, and gas flow aperture means for gas flow through an interior of the hollow body;
   (c) support means between the outer cylindrical member and each hollow body for supporting the hollow bodies within the cylindrical member such that their inclined inner walls face each other;
   (d) first and second inlets formed at an entrance end of the crucible, said first inlet comprising an annular aperture formed by the cylindrical member inner wall and hollow body outer walls and the second inlet being formed by inlet ends of the inclined inner walls, a flow path being formed at the entrance between the first and second glass inlets; and
   (e) an exit nozzle formed at an exit end of the crucible, said exit nozzle including: (i) a core forming means formed at lower edge portions of the facing inner walls of the hollow bodies, (ii) web forming means connecting to the core forming means and formed at exit edge portions of the inner walls, and (iii) annular member forming means connected to the web forming means and formed at the outer cylindrical member and exit edge portions of the hollow body outer walls.

9. The crucible of claim 8 wherein said support means comprises connecting struts between the cylindrical member inner wall and hollow body outer walls.

* * * * *